United States Patent
Lin

(10) Patent No.: US 12,253,411 B2
(45) Date of Patent: Mar. 18, 2025

(54) MICRO LIGHT EMITTING DEVICE INSPECTION APPARATUS

(71) Applicant: PlayNitride Display Co., Ltd., MiaoLi County (TW)

(72) Inventor: Cheng-Cian Lin, MiaoLi County (TW)

(73) Assignee: PlayNitride Display Co., Ltd., MiaoLi County (TW)

(*) Notice: Subject to any disclaimer, the term of this patent is extended or adjusted under 35 U.S.C. 154(b) by 222 days.

(21) Appl. No.: 18/084,560

(22) Filed: Dec. 20, 2022

(65) Prior Publication Data

US 2024/0183708 A1 Jun. 6, 2024

(30) Foreign Application Priority Data

Dec. 1, 2022 (TW) ................................. 111146087

(51) Int. Cl.
*G01J 1/42* (2006.01)
*G01J 1/04* (2006.01)

(52) U.S. Cl.
CPC ........... *G01J 1/4257* (2013.01); *G01J 1/0425* (2013.01)

(58) Field of Classification Search
CPC . G01J 1/4257; G01J 1/0425; G01J 2001/4247
See application file for complete search history.

(56) References Cited

U.S. PATENT DOCUMENTS

| | | |
|---|---|---|
| 6,290,382 B1 | 9/2001 | Bourn et al. |
| 2011/0031418 A1* | 2/2011 | Shcherback ............. G01J 1/04 250/559.29 |
| 2013/0265568 A1 | 10/2013 | Micheels et al. |
| 2014/0084191 A1* | 3/2014 | Tsai ....................... G01J 1/0425 250/578.1 |
| 2022/0034714 A1* | 2/2022 | Okuta .................... G01J 1/0425 |
| 2023/0083189 A1* | 3/2023 | Burgess ............... H01L 25/0753 506/37 |

(Continued)

FOREIGN PATENT DOCUMENTS

| | | | |
|---|---|---|---|
| TW | 201413224 | | 4/2014 |
| TW | 1734366 B | * | 7/2021 |
| TW | I734366 | | 7/2021 |

OTHER PUBLICATIONS

TWI734366B_Translation (Year: 2021).*
"Office Action of Taiwan Counterpart Application", issued on Aug. 30, 2023, p. 1-p. 8.

*Primary Examiner* — Tarifur R Chowdhury
*Assistant Examiner* — Carlos Perez-Guzman
(74) *Attorney, Agent, or Firm* — JCIPRNET

(57) ABSTRACT

A micro light emitting device inspection apparatus adapted to inspect a plurality of micro light emitting devices is provided. The micro light emitting device inspection apparatus includes a carrier stage, a light guide module and a detective module. The carrier stage is configured to hold the micro light emitting devices. The light guide module has a plurality of optical fibers. Each of the optical fibers has a light receiving surface and a light emitting surface away from each other. The at least one light beam is received by the light receiving surface of each optical fiber and exits through the light emitting surface of the optical fiber. The detective module is configured to receive and detect the at least one light beam from the light emitting surface of each optical fiber, thereby obtaining at least one optical property.

13 Claims, 17 Drawing Sheets

(56) References Cited

U.S. PATENT DOCUMENTS

2023/0097800 A1\* 3/2023 Fryman ............... H04B 10/801
398/182
2023/0118326 A1\* 4/2023 Pezeshki ............... H01L 31/173
385/49

\* cited by examiner

MICRO LIGHT EMITTING DEVICE INSPECTION APPARATUS

CROSS-REFERENCE TO RELATED APPLICATION

This application claims the priority benefit of Taiwan application serial no. 111146087, filed on Dec. 1, 2022. The entirety of the above-mentioned patent application is hereby incorporated by reference herein and made a part of this specification.

BACKGROUND

Technical Field

The invention relates to an inspection apparatus, and particularly relates to a micro light emitting device inspection apparatus.

Description of Related Art

In addition to the advantages of low energy consumption and long service life of materials, a micro light emitting diode (LED) display further has excellent optical performance, such as high color saturation, fast response speed and high contrast. In order to achieve lower production costs and greater product design margin, a manufacturing technology of the micro LED display adopts a method of chip transfer. For example, a mass transfer technology that directly transfers prefabricated micro LED chips to a backplane of a driving circuit. Specifically, a chip manufacturer needs to fabricate (or place) the micro LED chips required by the customer on a temporary storage substrate, and then the customer will transfer the micro LED chips stored on the temporary storage substrate to driving circuit boards of different products.

In order to inspect these micro LED chips stored on the temporary substrate, a current method is to use a probe on a probe card to contact an electrode or a pad of the chip to be tested and provide a test current in collaboration with a light collection method such as an integrating sphere to obtain optical properties of the micro LED chips. However, as a size of the micro LED chip becomes smaller and smaller, accuracy requirements on inspection apparatus also become higher. In addition, in the current process of conducting optical measurement by using the integrating sphere, only one micro LED chip may be lit at a time. Therefore, measurement of mass chips will take a long time for completion.

SUMMARY

The invention is directed to a micro light emitting device inspection apparatus, which satisfies measurement requirements on photoelectric properties of mass light emitting devices, and an inspection method thereof is relatively flexible.

The invention provides a micro light emitting device inspection apparatus adapted to inspect a plurality of micro light emitting devices and including a carrier stage, a light guide module and a detective module. The carrier stage is configured to hold the micro light emitting devices, and each of the micro light emitting devices emits a light beam. The light guide module is disposed on an optical path of the light beam emitted by each of the micro light emitting devices, and includes a plurality of optical fibers. Each of the optical fibers has a light receiving surface and a light emitting surface away from each other. The light receiving surface of each optical fiber is disposed corresponding to at least one micro light emitting device, and is configured to receive at least one light beam emitted by the at least one micro light emitting device. The at least one light beam is transmitted in the optical fiber and exits through the light emitting surface the optical fiber. The detective module is disposed on one side of the light emitting surfaces of the optical fibers. The detective module is configured to receive and detect the at least one light beam from the light emitting surface of each optical fiber, so as to obtain at least one optical property.

The invention provides a micro light emitting device inspection apparatus adapted to inspect a plurality of micro light emitting devices and including a carrier stage, a light guide module and a detective module. The carrier stage is configured to hold the micro light emitting devices. Each of the micro light emitting devices emits at least two light beams. The light guide module is disposed on an optical path of the two light beams emitted by each of the micro light emitting devices, and includes a plurality of optical fibers. Each of the optical fibers has a light receiving surface and a light emitting surface away from each other. Each of the micro light emitting devices emits the at least two light beams respectively towards at least two light receiving surfaces of at least two optical fibers. The at least two optical fibers receive the at least two light beams and emit the at least two light beams through at least two light emitting surfaces of the at least two optical fibers. The detective module is disposed on one side of the light emitting surfaces of the optical fibers. The detective module is configured to receive and detect the at least two light beams from the at least two optical fibers, so as to obtain at least one optical property.

Based on the above description, in the micro light emitting device inspection apparatus according to an embodiment of the invention, independent arrangement of the plurality of optical fibers ensures that the multiple light beams emitted by the plurality of micro light emitting devices will not interfere with each other during a process of being transmitted to the detective module. Therefore, during the inspection process, these micro light emitting devices may be enabled simultaneously, and the multiple emitted light beams may be simultaneously received and analyzed by the detective module to obtain the respective optical properties of the light beams. In addition to greatly reducing an inspection time, inspection flexibility of the micro light emitting device inspection apparatus is also increased to meet different inspection requirements.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "left," "right," "front," "back," etc., is used with reference to the orientation of the Figure(s) being described and are not intended to be limiting of the invention.

Figure 1:
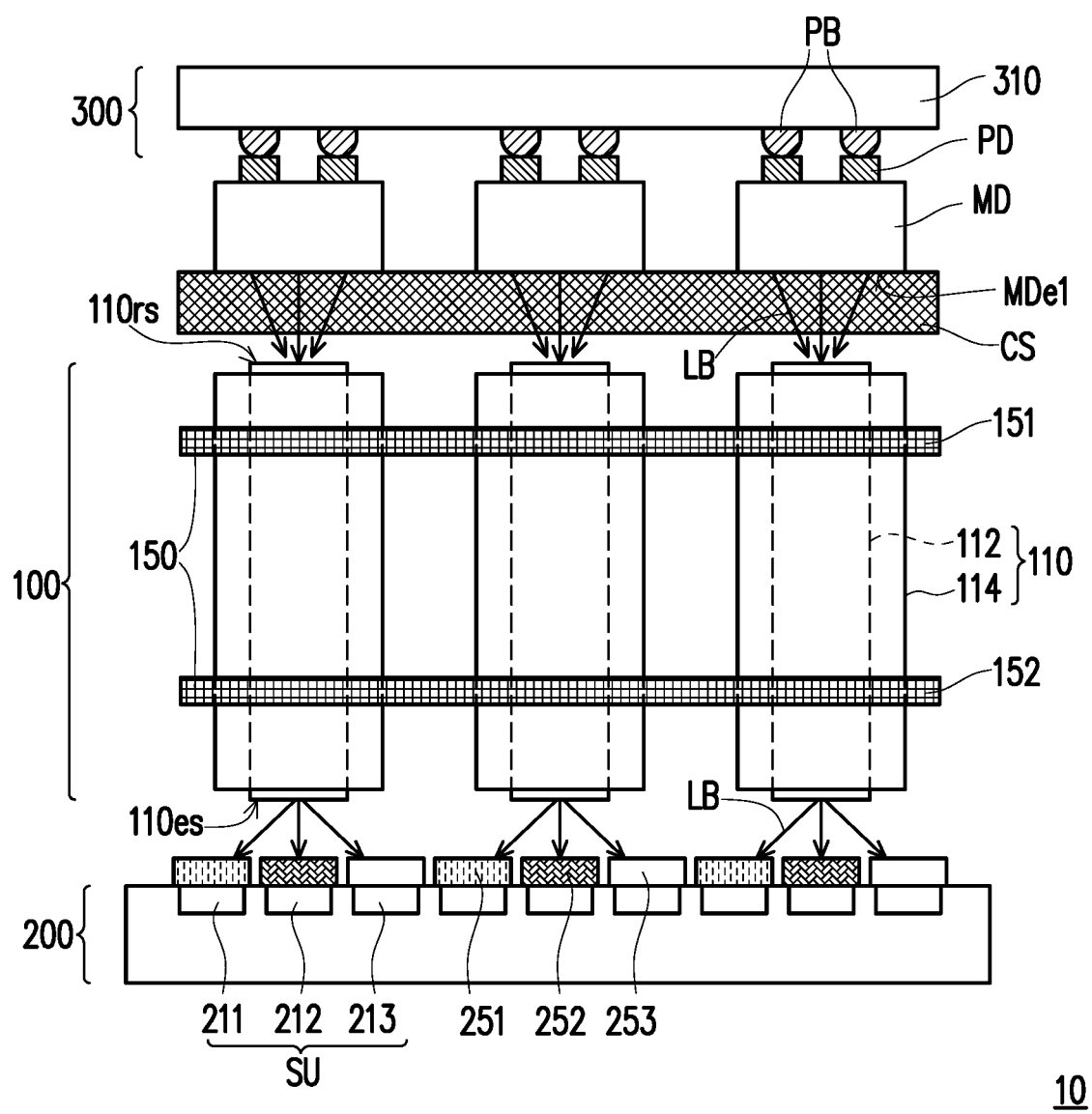
FIG. 1 is a schematic side view of a micro light emitting device inspection apparatus according to a first embodiment of the invention.
Figure 2:
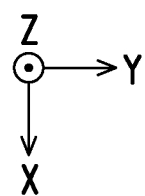
FIG. 2 is a schematic top view of some modules of the micro light emitting device inspection apparatus in FIG. 1.
Figure 2:
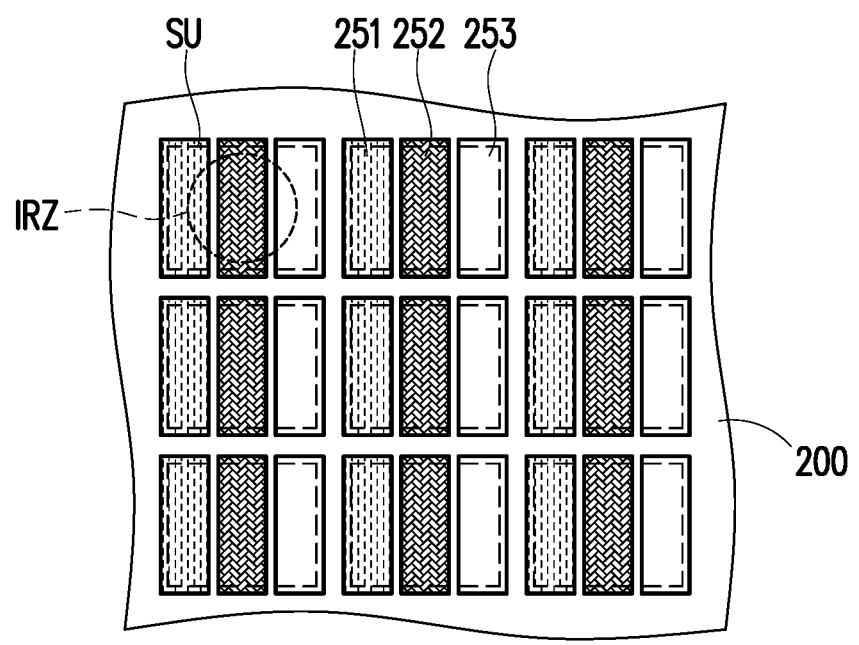
Figure 3A:
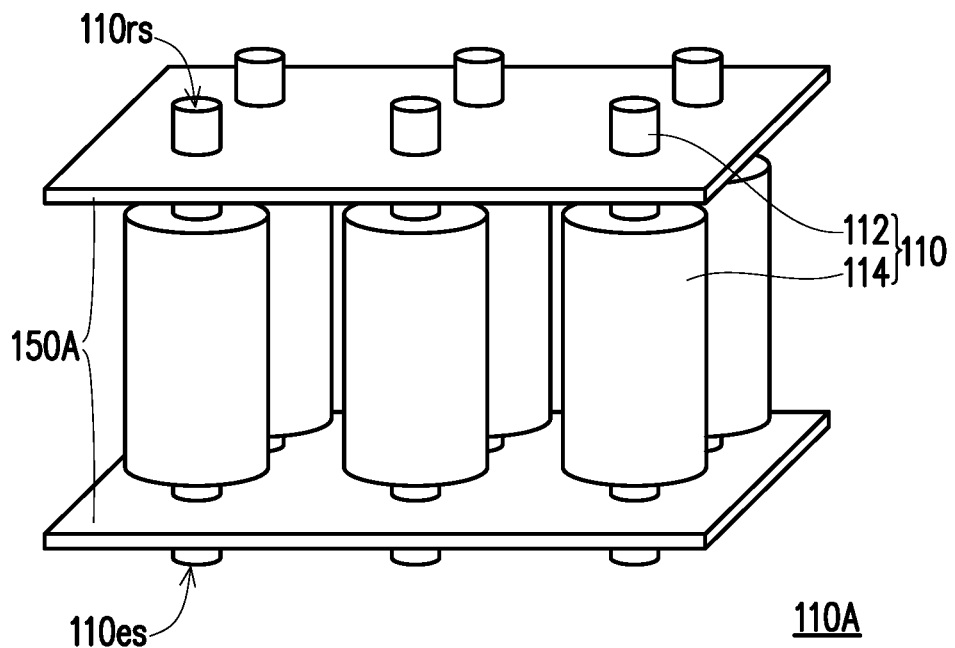
FIG. 3A and FIG. 3B are schematic three-dimensional views of other varied embodiments of a light guide module in FIG. 1.
Figure 3B:
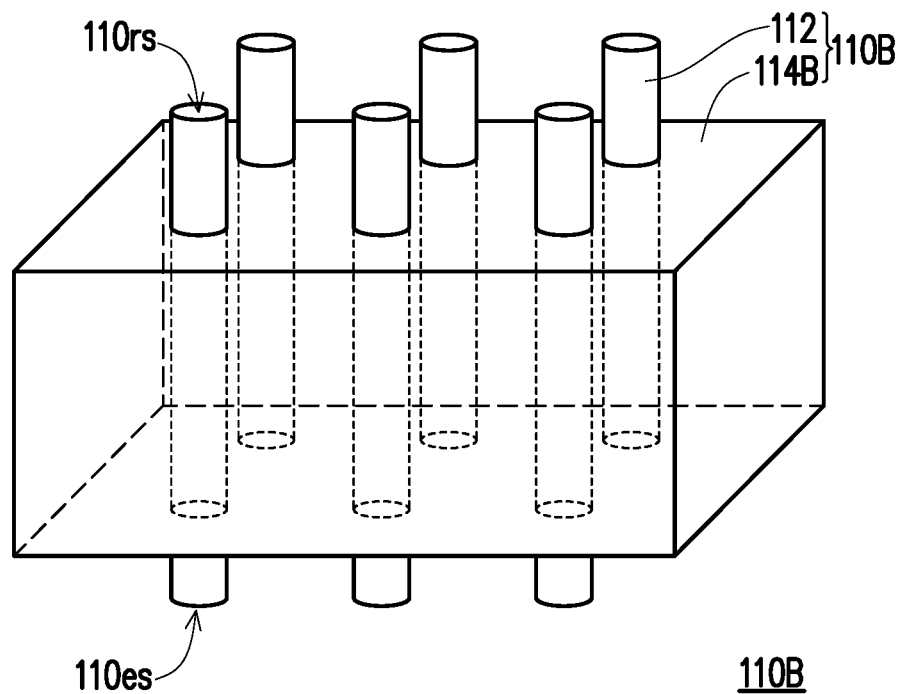

FIG. 1 is a schematic side view of a micro light emitting device inspection apparatus according to a first embodiment of the invention. FIG. 2 is a schematic top view of some modules of the micro light emitting device inspection apparatus in FIG. 1. FIG. 3A and FIG. 3B are schematic three-dimensional views of other varied embodiments of a light guide module in FIG. 1.

Referring to FIG. 1, a micro light emitting device inspection apparatus 10 of the embodiment is adapted to detect a plurality of micro light emitting devices MD, and includes a carrier stage CS, a light guide module 100, a detective module 200 and a driving module 300. The carrier stage CS is configured to carry the plurality of micro light emitting devices MD, which may be a temporary substrate storing these micro light emitting devices MD before a transfer process of these micro light emitting devices MD, but the invention is not limited thereto. In the embodiment, the carrier stage CS may be made of a transparent plate, such as glass, quartz, polyimide (PI), poly(methyl methacrylate) (PMMA), polyethylene terephthalate (PET) or polycarbonate (PC), but the invention is not limited thereto.

The light guide module 100 is disposed on one side of the carrier stage CS away from the micro light emitting devices MD, and includes a plurality of optical fibers 110 and a fixing structure 150. The plurality of optical fibers 110 are arranged independently from each other and may form an optical fiber bundle connected to each other through the fixing structure 150. Each optical fiber 110 is, for example, composed of a core layer 112 and a cladding layer 114 cladding the core layer 112, and has a light receiving surface 110rs and a light emitting surface 110es away from each other. The light receiving surface 110rs is defined by, for example, one end surface of the core layer 112 facing the carrier stage CS, and the light emitting surface 110es is, for example, defined by the other end surface of the core layer 112 away from the carrier stage CS.

In the embodiment, the fixing structure 150 is, for example, at least one flat plate with a plurality of holes, and the plurality of optical fibers 110 pass through the holes respectively. For example, the fixing structure 150 may be composed of two flat plates with a plurality of holes, and configurations of the holes on the two flat plates are substantially the same. The plurality of holes of a flat plate 151 closer to the light receiving surface 110rs of the optical fiber 110 are set corresponding to the multiple micro light emitting devices MD on the carrier stage CS, while the plurality of holes of the another flat plate 152 closer to the light emitting surface 110es of the optical fiber 110 are set corresponding to a plurality of sensing units SU of the detective module 200.

In the embodiment, a size of the hole on the flat plate is substantially a size of an overall diameter of the core layer 112 and the cladding layer 114 of the optical fiber 110. Namely, the optical fiber 110 penetrates through the two flat plates of the fixing structure 150 through the cladding layer 114. However, the invention is not limited thereto. As shown in FIG. 3A, in another varied embodiment, the optical fiber 110 of the light guide module 100A may pass through the two flat plates of the fixing structure 150A through the core layer 112. Namely, the size of hole on the flat plate of the fixing structure 150A is substantially a size of a diameter of the core layer 112 of the optical fiber 110.

As shown in FIG. 3B, in still another varied embodiment, a cladding layer 114B of a plurality of optical fibers 110B of a light guide module 100B may also be implemented in the form of a block material. More specifically, the plurality of core layers 112 of the plurality of optical fibers 110B are embedded in the cladding layer 114B formed by a single block material, and the block material has a lower refractive index than that of the core layer 112. Particularly, since the core layer 112 of each optical fiber 110 in the aforementioned embodiment is covered by its respective cladding layer 114 (as shown in FIG. 1), and the cladding layer 114 requires to have a certain film thickness, it has a limitation for shortening an arrangement pitch of multiple optical fibers. Therefore, by using the cladding layer 114B formed of the single block material to wrap the plurality of core layers 112 of the plurality of optical fibers 110B, it has more flexibility in the design of the arrangement pitch, and the manufacturing process is less difficult. In other words, the light guide module 100B in FIG. 3B may meet design and process requirements of high-density optical fiber bundles.

Referring to FIG. 1, in the embodiment, the light receiving surface 110rs of each optical fiber 110 may be disposed corresponding to one micro light emitting device MD on the carrier stage CS, where the micro light emitting device MD is, for example, a micro light emitting diode (micro-LED). More specifically, the micro light emitting device MD has a light emitting surface MDe1 connected to the carrier stage CS. The light receiving surface 110rs of the optical fiber 110 is disposed toward the light emitting surface MDe1 of the micro light emitting device MD, and is configured to receive a light beam LB emitted by the micro light emitting device MD. The light beam LB may be transmitted from the light receiving surface 110rs to the light emitting surface 110es by the optical fiber 110, and exits from the light emitting surface 110es to leave the optical fiber 110.

However, the invention is not limited thereto. In an embodiment that is not shown, the light guide module 100 may be arranged on one side of the micro light emitting device MD away from the carrier stage CS, so that the light beam LB may be directly transmitted to the light receiving surface 110rs of the optical fiber 110 to achieve a better light receiving effect.

The detective module 200 is disposed on one side of the light emitting surfaces 110es of the optical fibers 110, and is configured to receive and detect the light beam LB from the light emitting surface 110es of each optical fiber 110 (i.e. the light beam LB leaving the optical fiber 110), so as to obtain an optical property of the corresponding micro light emitting device MD. The optical property may include one or more of the following properties, such as color coordinates, dominant wavelength, peak wavelength, luminance or color temperature.

In detail, the detective module 200 may be provided with a plurality of sensing units SU, and these sensing units SU are disposed corresponding to the plurality of light-emitting surfaces 110es of the plurality of optical fibers 110. For example, the sensing units SU may be respectively arranged in a plurality of rows and a plurality of columns along a direction X and a direction Y (i.e., arranged in an array).

In the embodiment, the sensing unit SU may include a first sensor 211, a second sensor 212 and a third sensor 213, and a first filter pattern 251, a second filter pattern 252 and a third filter pattern 253 may be disposed between the sensing unit SU and the optical fiber 110. The first filter pattern 251 is overlapped with the first sensor 211. The second filter pattern 252 is overlapped with the second sensor 212. The third filter pattern 253 is overlapped with the third sensor 213. The overlapping relationship here is, for example, that the filter pattern is overlapped with the sensor along a normal direction (for example, a direction Z) of the light emitting surface 110es of the optical fiber 110. If not specifically mentioned below, an overlapping relationship of two components is defined in the same way, and detail thereof is not repeated.

To be more specific, the first sensor 211 and the first filter pattern 251 may constitute a first sensing pixel of the sensing unit SU, the second sensor 212 and the second filter pattern 252 may constitute a second sensing pixel of the sensing unit SU, and the third sensor 213 and the third filter pattern 253 may constitute a third sensing pixel of the sensing unit SU. For example, the first filter pattern 251, the second filter pattern 252 and the third filter pattern 253 may be respectively used to filter out red light, green light and blue light. Namely, the first sensing pixel, the second sensing pixel and the third sensing pixel of the embodiment may be respectively used to sense the red light, the green light and the blue light, but the invention is not limited thereto.

The sensor of the detective module 200 may be a charge-coupled device (CCD) sensor or a complementary metal-oxide-semiconductor (CMOS) sensor. For example, the detective module 200 may be optionally provided with an unshown infrared cut filter (IR-Cut filter), a collimating structure layer, a plurality of micro lens, or a combination thereof at a side of the sensor facing the optical fiber 110.

In the embodiment, the light emitting surface 110es of each optical fiber 110 may correspond to one sensing unit SU. Referring to FIG. 1 and FIG. 2, an irradiation region IRZ of the light beam LB leaving the optical fiber 110 from the light emitting surface 110es on the detective module 200 is limited to a distribution range of a single sensing unit SU (i.e., a setting area of the first sensor 211, the second sensor 212 and the third sensor 213). Namely, the light beam LB emitted by each micro light emitting device MD may be transmitted to a corresponding sensing unit SU on the detective module 200 through a corresponding optical fiber 110, and the independently arranged optical fiber 110 may prevent the light beam LB from being affected by another light beam LB emitted by another micro light emitting device MD during transmission, or prevent a part of the light beam LB from leaking to other non-corresponding sensing units SU.

Therefore, during the inspection process of the plurality of micro light emitting devices MD, these micro light emitting devices MD on the carrier stage CS may be enabled at the same time, and the emitted plurality of light beams LB may be simultaneously and respectively transmitted to the detective module 200 through the plurality of optical fibers 110 for sensing and analysis, so as to obtain the respective optical properties of the light beams LB. Accordingly, the inspection time of the micro light emitting devices MD may be greatly reduced.

Further, in order to drive the plurality of micro light emitting devices MD on the carrier stage CS, the micro light emitting device inspection apparatus 10 may further include a driving module 300 disposed on a side of the plurality of micro light emitting devices MD away from the carrier stage CS. For example, the driving module 300 may be a probe card, which includes a circuit board 310 and a plurality of probes PB. These probes PB are disposed on a surface of the circuit board 310 facing the plurality of micro light emitting devices MD. In the embodiment, the micro light emitting device MD may be configured with a pad group composed of two pads PD, so that the driving module 300 may be configured with a probe group composed of two probes PB, but the invention is not limited thereto.

During the inspection process of the optical properties of the micro light emitting devices MD, the driving module 300 may temporarily form an electrical connection relationship with these micro light emitting devices MD by contacting the plurality of probe groups with a plurality of pad groups of the plurality of micro light emitting devices MD, and provide a driving current to enable these micro light emitting devices MD to emit light. In particular, through the above-mentioned electrical connection relationship, in addition to measuring the optical properties of the micro light emitting devices MD, the driving module 300 may further measure electrical properties of the micro light emitting devices MD. The electrical properties may include one or more of the following properties, such as a resistance value, a capacitance value, a forward voltage or a forward current value.

For example, the driving module 300 may additionally provide a test current to drive the micro light emitting devices MD and obtain the above-mentioned electrical properties. Alternatively, when the driving module 300 provides the driving current to measure the above-mentioned optical properties, the measurement of the electrical properties is conducted synchronously. Namely, the configuration relationship between the plurality of optical fibers 110, the plurality of micro light emitting devices MD and the plurality of sensing units SU may not only reduce the inspection time of the mass micro light emitting devices MD, but may also increase inspection flexibility of the micro light emitting device inspection apparatus 10 to meet different inspection requirements.

On the other hand, the plurality of micro light emitting devices MD on the carrier stage CS may optionally include the micro light emitting devices MD having one or more light emitting colors. For example, in the embodiment, the light emitting colors of the plurality of micro light emitting devices MD may include red, green and blue. Namely, the micro light emitting device MD may be a red micro LED, a green micro LED or a blue micro LED, but the invention is not limited thereto.

In particular, a cross-sectional area of the light beam LB emitted by each micro light emitting device MD on the carrier stage CS may be smaller than an area of the light receiving surface 110rs of the optical fiber 110. In order to prevent each optical fiber 110 from receiving the light beam LB emitted by the non-corresponding micro light emitting device MD, a distance between the light receiving surface 110rs of the optical fiber 110 and the light emitting surface MDe1 of the corresponding micro light emitting device MD may be adjusted to make an acceptance cone of the optical fiber 110 only covers the corresponding micro light emitting device MD. Namely, light beams outside a range of the acceptance cone cannot be transmitted in the optical fiber 110 to filter out the light beams LB emitted by non-corresponding micro light emitting devices MD. In addition, since the acceptance cone of the optical fiber 110 may be different for light beams LB of different wavelengths, in another unshown varied embodiment, the distance between the light receiving surface 110rs of each optical fiber 110 and the corresponding micro light emitting device MD may be optimized according to a wavelength of the received light beam, so as to avoid the problem of optical signal crosstalk between multiple optical fibers.

Other embodiments will be listed below to describe the invention in detail, where the same reference numbers denote the same or like components, and descriptions of the same technical contents are omitted. The aforementioned embodiment may be referred for descriptions of the omitted parts, and detailed descriptions thereof are not repeated in the following embodiment.

Figure 4:
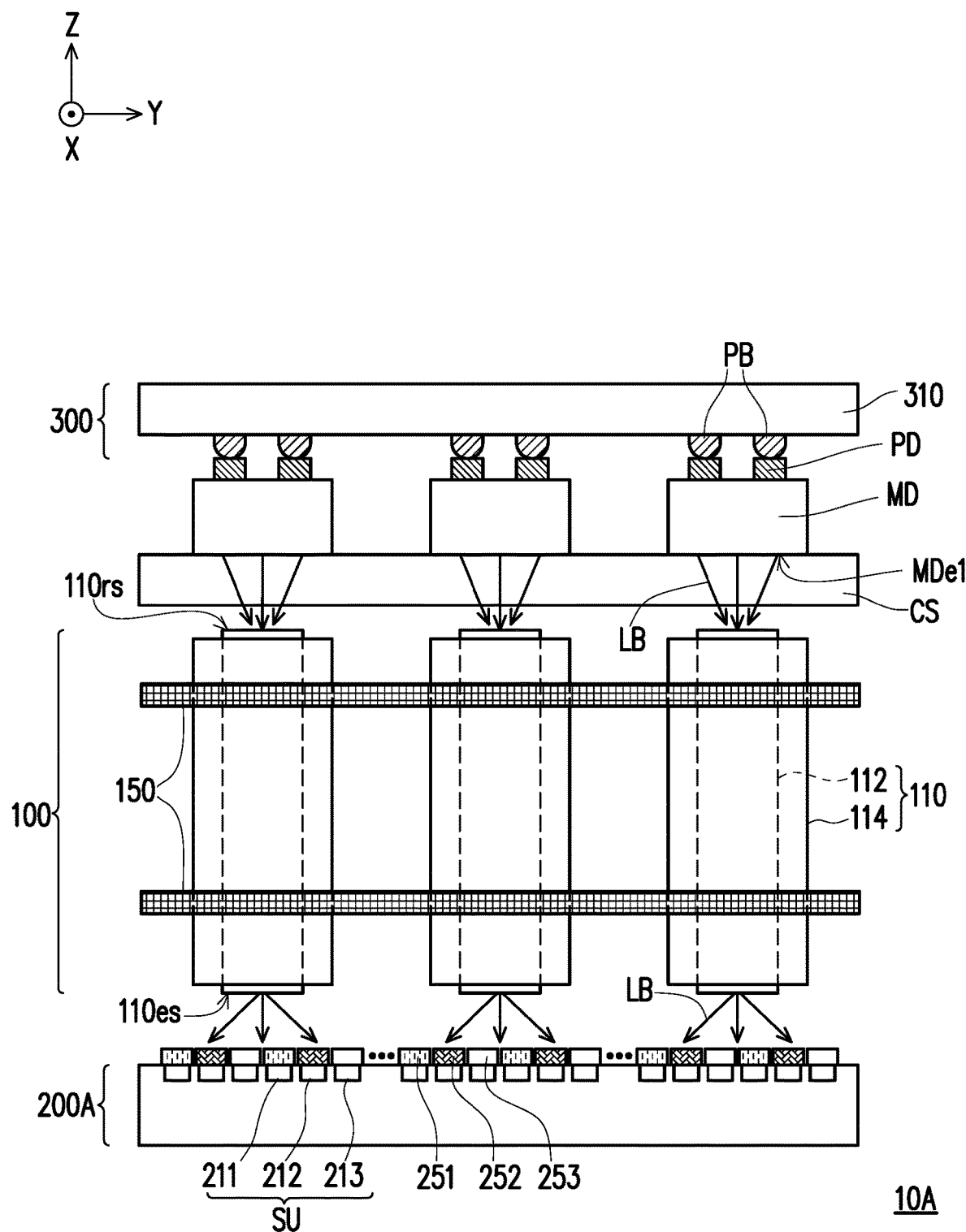
FIG. 4 is a schematic side view of a micro light emitting device inspection apparatus according to a second embodiment of the invention.
Figure 5:
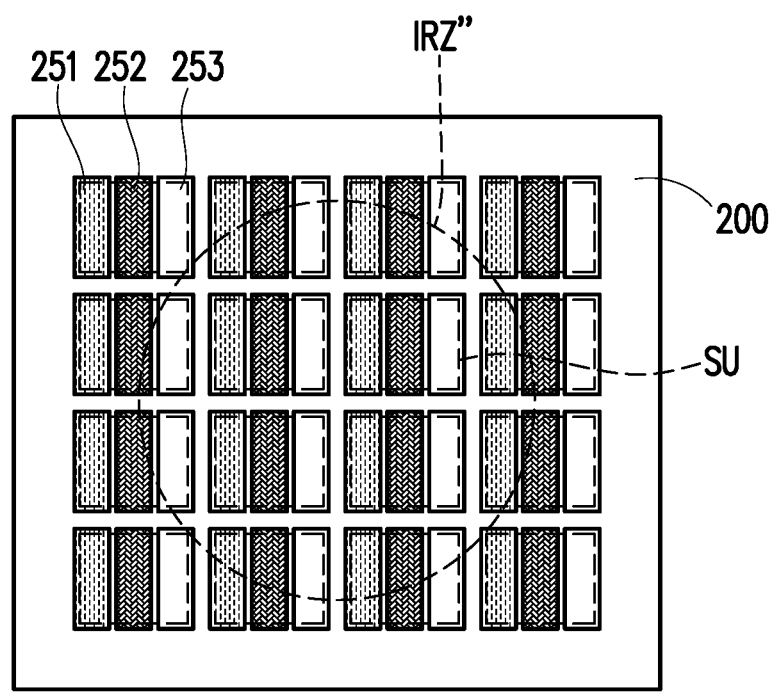
FIG. 5 is a schematic top view of some modules of the micro light emitting device inspection apparatus of FIG. 4.

FIG. 4 is a schematic side view of a micro light emitting device inspection apparatus according to a second embodiment of the invention. FIG. 5 is a schematic top view of some modules of the micro light emitting device inspection apparatus of FIG. 4.

Referring to FIG. 4 and FIG. 5, a difference between a micro light emitting device inspection apparatus 10A of the embodiment and the micro light emitting device inspection apparatus 10 of FIG. 1 is that the number of sensing units corresponding to each optical fiber is different. To be specific, different from the situation that the number of the sensing units SU corresponding to each optical fiber 110 in FIG. 1 is one, the number of the sensing units SU corresponding to each optical fiber 110 in the embodiment is four.

For example, an irradiation region IRZ" of the light beam LB leaving from the light emitting surface 110es of the optical fiber 110 on a detective module 200A may completely cover a plurality of sensing units SU arranged in a 4×4 matrix, where only sensing signals received by the sensing units SU completely within the irradiation region IRZ" of the light beam LB are stored and analyzed to obtain the optical properties of the corresponding micro light emitting device MD. Namely, in the embodiment, the effective sensing units SU set corresponding to each optical fiber 110 are four sensing units SU arranged in a 2×2 matrix within the irradiation region IRZ", but the invention is not limited thereto. In another implementation of the embodiment, the effective sensing units SU set corresponding to each optical fiber 110 may also include the sensing units SU partially overlapping the irradiation region IRZ", so as to increase sensing accuracy.

Figure 6A:
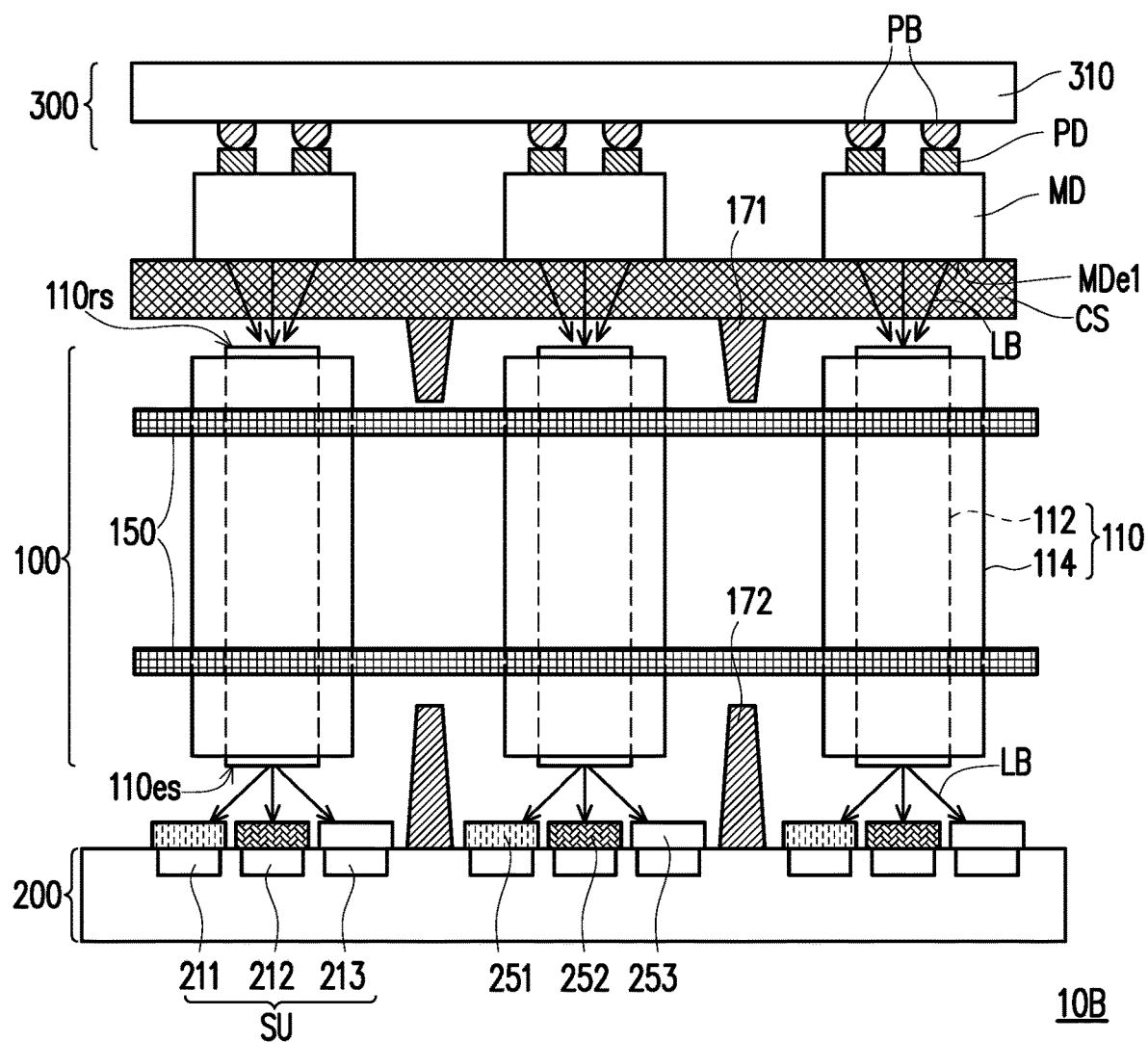
FIG. 6A is a schematic side view of a micro light emitting device inspection apparatus according to a third embodiment of the invention.
Figure 6B:
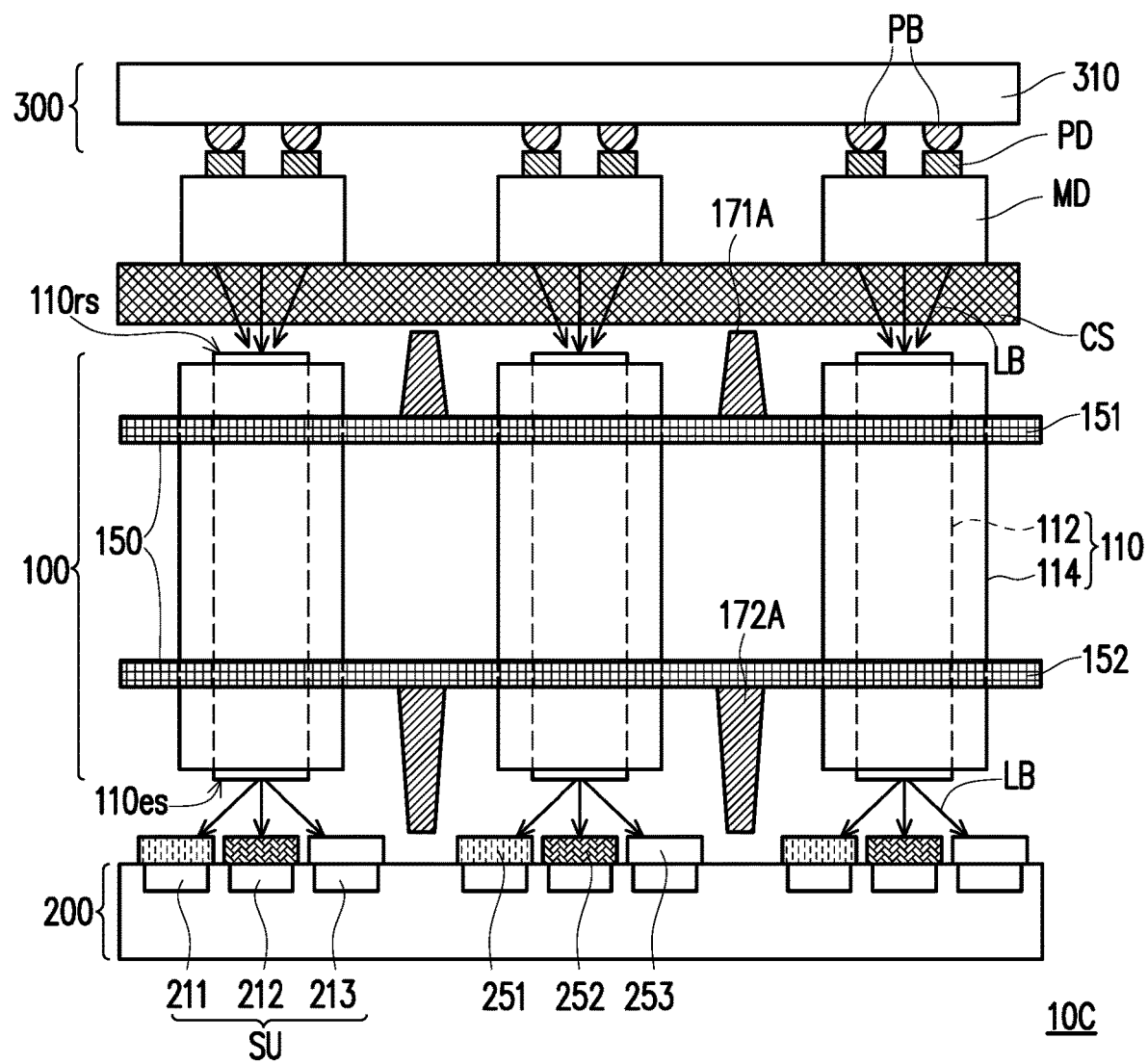
FIG. 6B is a schematic side view of a micro light emitting device inspection apparatus according to a fourth embodiment of the invention.

FIG. 6A is a schematic side view of a micro light emitting device inspection apparatus according to a third embodiment of the invention. FIG. 6B is a schematic side view of a micro light emitting device inspection apparatus according to a fourth embodiment of the invention.

Referring to FIG. 6A, a difference between a micro light emitting device inspection apparatus 10B of the embodiment and the micro light emitting device inspection apparatus 10 of FIG. 1 is that: the micro light emitting device inspection apparatus 10B of the embodiment may further optionally include a plurality of first light blocking structures 171 and a plurality of second light blocking structures 172, and any two adjacent ones of the plurality of optical fibers 110 are provided with one first light blocking structure 171 and one second light blocking structure 172.

For example, the plurality of light receiving surfaces 110rs of the plurality of optical fibers 110 may be blocked by the plurality of first light blocking structures 171, so as to prevent the light beams LB emitted by the micro light emitting devices MD from leaking to the light receiving surfaces 110rs of the non-corresponding adjacent optical fibers 110. Similarly, the plurality of light emitting surfaces 110es of the plurality of optical fibers 110 may be blocked by the plurality of second light blocking structures 172, so as to prevent the light beam LB transmitted through any optical fiber 110 from leaking to non-corresponding adjacent sensing units SU after leaving the optical fiber 110.

In the embodiment, the plurality of first light blocking structures 171 are arranged on a surface of the carrier stage CS away from the micro light emitting devices MD, and the plurality of second light blocking structures 172 are arranged on a surface of the detective module 200 facing the light guide module 100. However, the invention is not limited thereto. As shown in FIG. 6B, in another embodiment, a plurality of first light blocking structures 171A of a micro light emitting device inspection apparatus 10C may be arranged on a surface of the flat plate 151 of the fixing structure 150 facing the carrier stage CS, and a plurality of second light blocking structures 172A may be arranged on a surface of the other flat plate 152 of the fixing structure 150 facing the detective module 200. In another embodiment that is not shown, the plurality of light blocking structures may also be only disposed between the plurality of light receiving surfaces 110rs or the plurality of light emitting surfaces 110es of the plurality of optical fibers 110.

It is particularly noted that, in another varied embodiment of FIG. 6B, an end portion of the first light blocking structure 171A disposed on the flat plate 151 that is away from the flat plate 151 may contact the carrier stage CS, and an end portion of the second light blocking structure 172A disposed on the flat plate 152 that is away from the flat plate 152 may contact the detective module 200. In this way, the distance between the light receiving surface 110rs of the optical fiber 110 and the micro light emitting device MD and the distance between the light emitting surface 110es of the optical fiber 110 and the detective module 200 may be stably controlled within a preferred range to optimize light receiving efficiency of the optical fiber 110 and the sensing units SU to the light beam LB, thereby improving a light energy utilization rate.

Figure 7A:
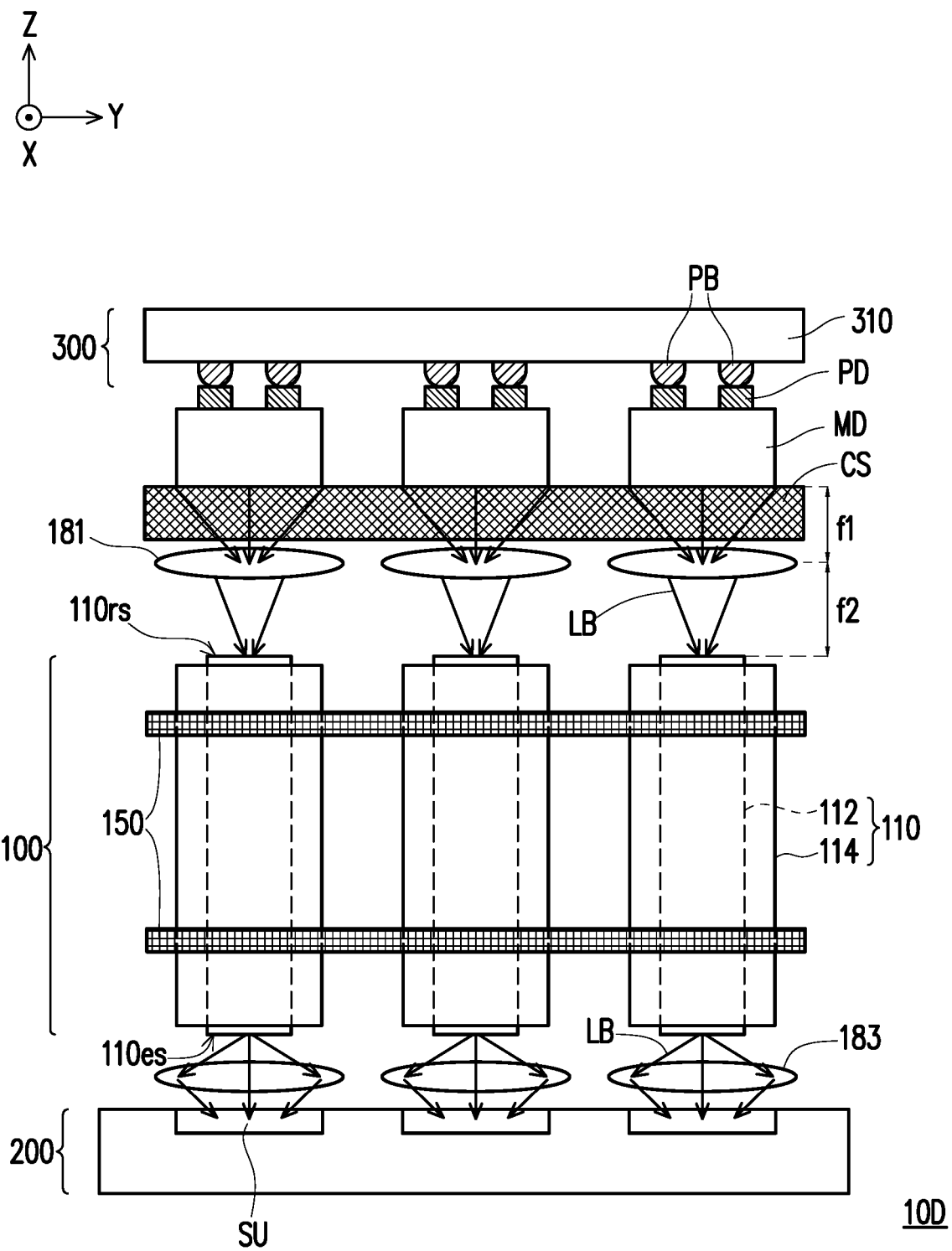
FIG. 7A is a schematic side view of a micro light emitting device inspection apparatus according to a fifth embodiment of the invention.
Figure 7B:
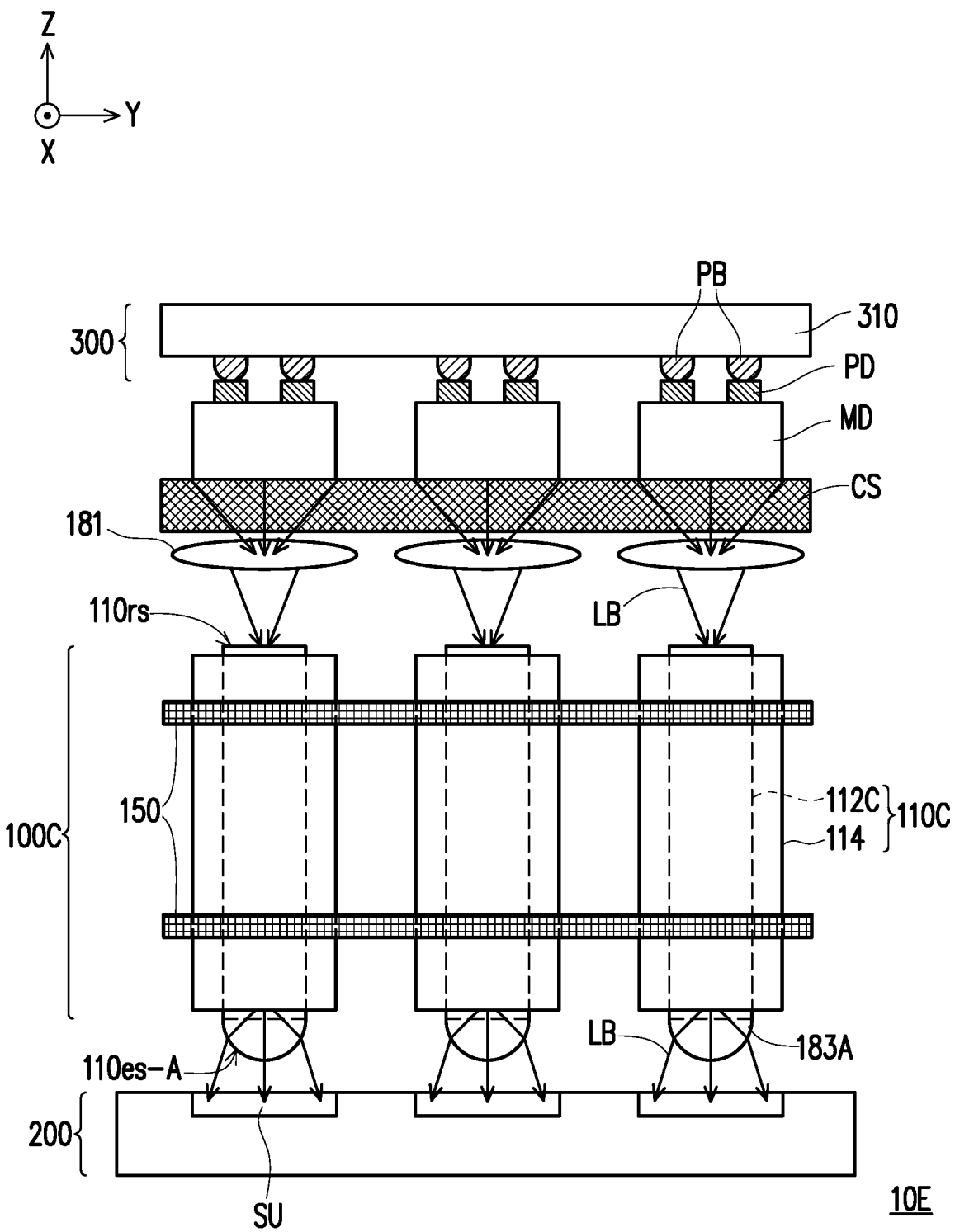
FIG. 7B is a schematic side view of a micro light emitting device inspection apparatus according to a sixth embodiment of the invention.
Figure 7C:
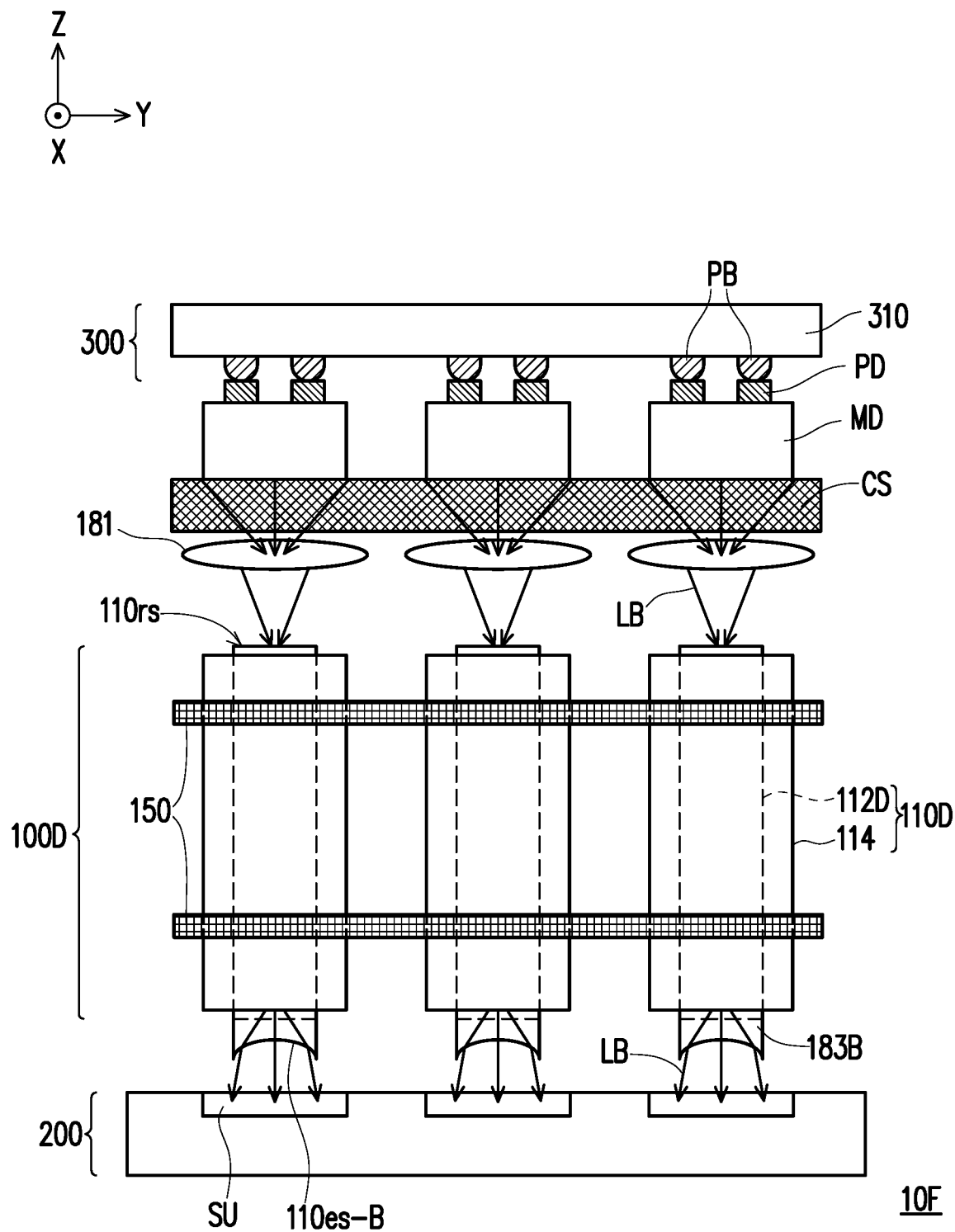
FIG. 7C is a schematic side view of a micro light emitting device inspection apparatus according to a seventh embodiment of the present invention.

FIG. 7A is a schematic side view of a micro light emitting device inspection apparatus according to a fifth embodiment of the invention. FIG. 7B is a schematic side view of a micro light emitting device inspection apparatus according to a sixth embodiment of the invention. FIG. 7C is a schematic side view of a micro light emitting device inspection apparatus according to a seventh embodiment of the present invention.

Referring to FIG. 7A, a difference between a micro light emitting device inspection apparatus 10B of the embodiment and the micro light emitting device inspection apparatus 10 of FIG. 1 is that: a micro light emitting device inspection apparatus 10D of the embodiment may further optionally configure a plurality of light collecting devices 181 between the carrier stage CS and the light guide module 100 and configure a plurality of light converging devices 183 between the detective module 200 and the light guide module 100. Where, the light collecting devices 181 are respectively overlapped to the plurality of light receiving surfaces 110rs of the plurality of optical fibers 110, and the light converging devices 183 are respectively overlapped to the plurality of light emitting surfaces 110es of the plurality of optical fibers 110.

In the embodiment, the light collecting device 181 is, for example, an optical lens or a lens group, and is configured to collect more light beams LB coming from the micro light emitting device MD and emitted at a larger angle, and ensure that the light beam LB is incident on the light receiving surface 110rs of the optical fiber 110 within a range of a numerical aperture (NA) of the optical fiber 110. In order to collect more large-angle light beams LB from the micro light emitting device MD, the distance between the light collecting device 181 and the micro light emitting device MD may be smaller than the distance between the light collecting device 181 and the light receiving surface 110rs of the optical fiber 110 (i.e., the light collecting device 181 is closer to the micro light emitting device MD). In detail, the light collecting device 181 has a first focal length f1 on one side facing the micro light emitting device MD, and has a second focal length f2 on the other side facing the optical fiber 110. It should be particularly noted that the first focal length f1 is less than the second focal length f2.

On the other hand, the distance between the light collecting device 181 and the light receiving surface 110rs of the optical fiber 110 may be greater than the distance between the light collecting device 181 and the micro light emitting device MD (i.e., the light collecting device 181 is farther away from the light receiving surface 110rs of the optical fiber 110), so that an angle (i.e., the incident angle) of the light beam LB entering the light receiving surface 110rs of the optical fiber 110 after passing through the light collecting device 181 may be reduced.

In the embodiment, the light converging device 183 is, for example, an optical lens, and is configured to converge the light beam LB leaving the optical fiber 110 to be within a distribution range of the sensing unit SU as much as possible, so as to further improve the light energy utilization rate of the micro light emitting device inspection apparatus 10D.

However, the invention is not limited thereto. Referring to FIG. 7B, in another varied embodiment, light converging devices 183A of a micro light emitting device inspection apparatus 10E may be directly integrated on optical fibers 110C of a light guide module 100C. More specifically, a core layer 112C of the optical fiber 110C may form a convex lens structure serving as the light converging device 183A at an end portion facing the detective module 200. Namely, a light emitting surface 110es-A of the optical fiber 110C may be a curved surface convex toward the detective module 200, but the invention is not limited thereto.

Referring to FIG. 7C, in yet another varied embodiment, the micro light emitting device inspection apparatus 10F may also integrate a concave lens structure on a core layer 112D of an optical fiber 110D of a light guide module 100D as a light converging device 183B. Namely, a light emitting surface 110es-B of the optical fiber 110D may be a curved surface concave toward the carrier stage CS. Regardless of applying the light converging device 183A in FIG. 7B or the light converging device 183B in FIG. 7C, the sensing unit SU may receive more light beams LB leaving the optical fiber, thereby improving the light energy utilization rate of the micro light emitting device inspection apparatus 10E and the micro light emitting device inspection apparatus 10F.

It should be particularly noted that, in addition to the above-mentioned implementations, the light converging devices may also be arranged on the sensors of the detective module, for example: directly arranged on the filter patterns overlapped with the sensors (such as the filter patterns of FIG. 1).

Figure 8A:
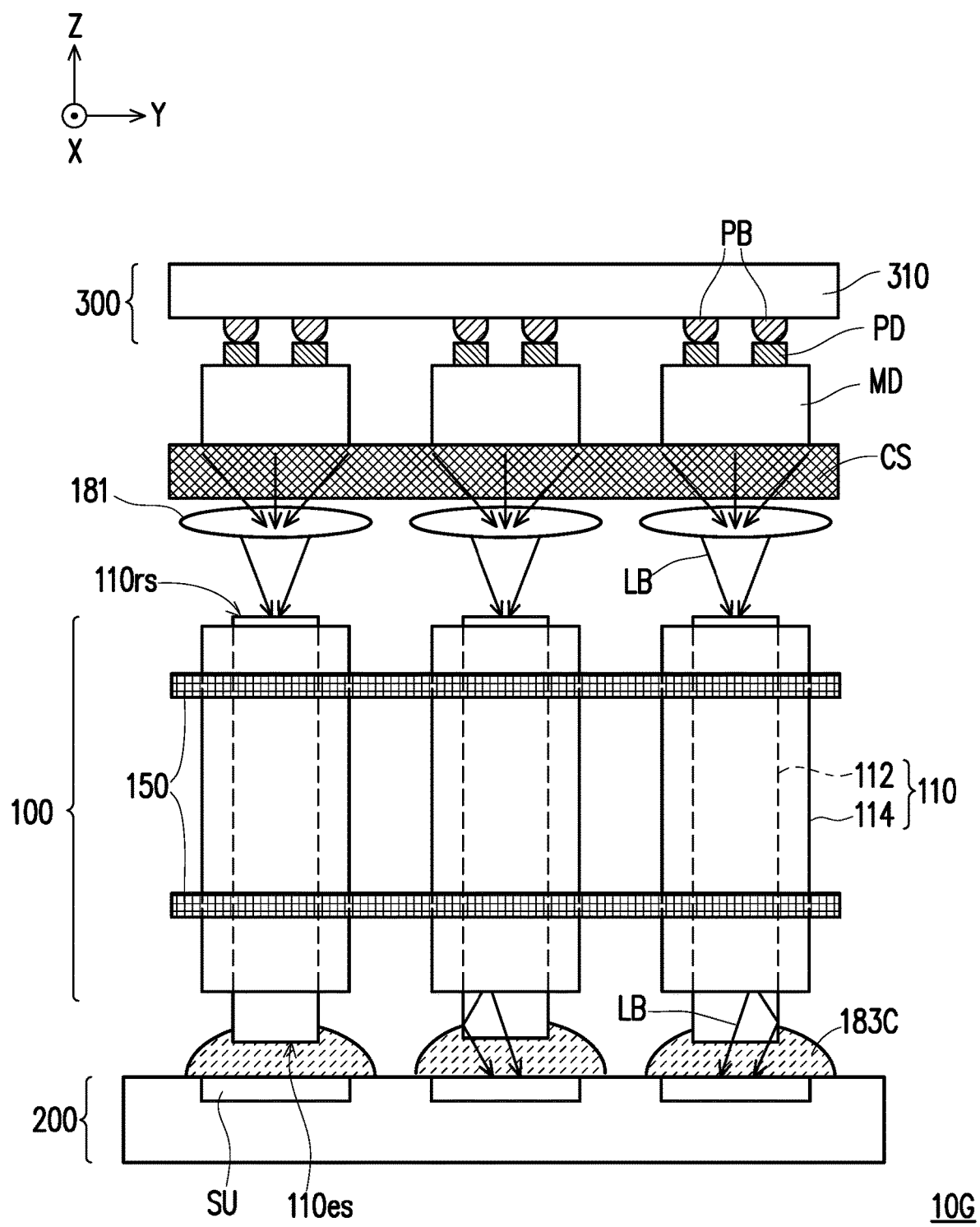
FIG. 8A is a schematic side view of a micro light emitting device inspection apparatus according to an eighth embodiment of the invention.
Figure 8B:
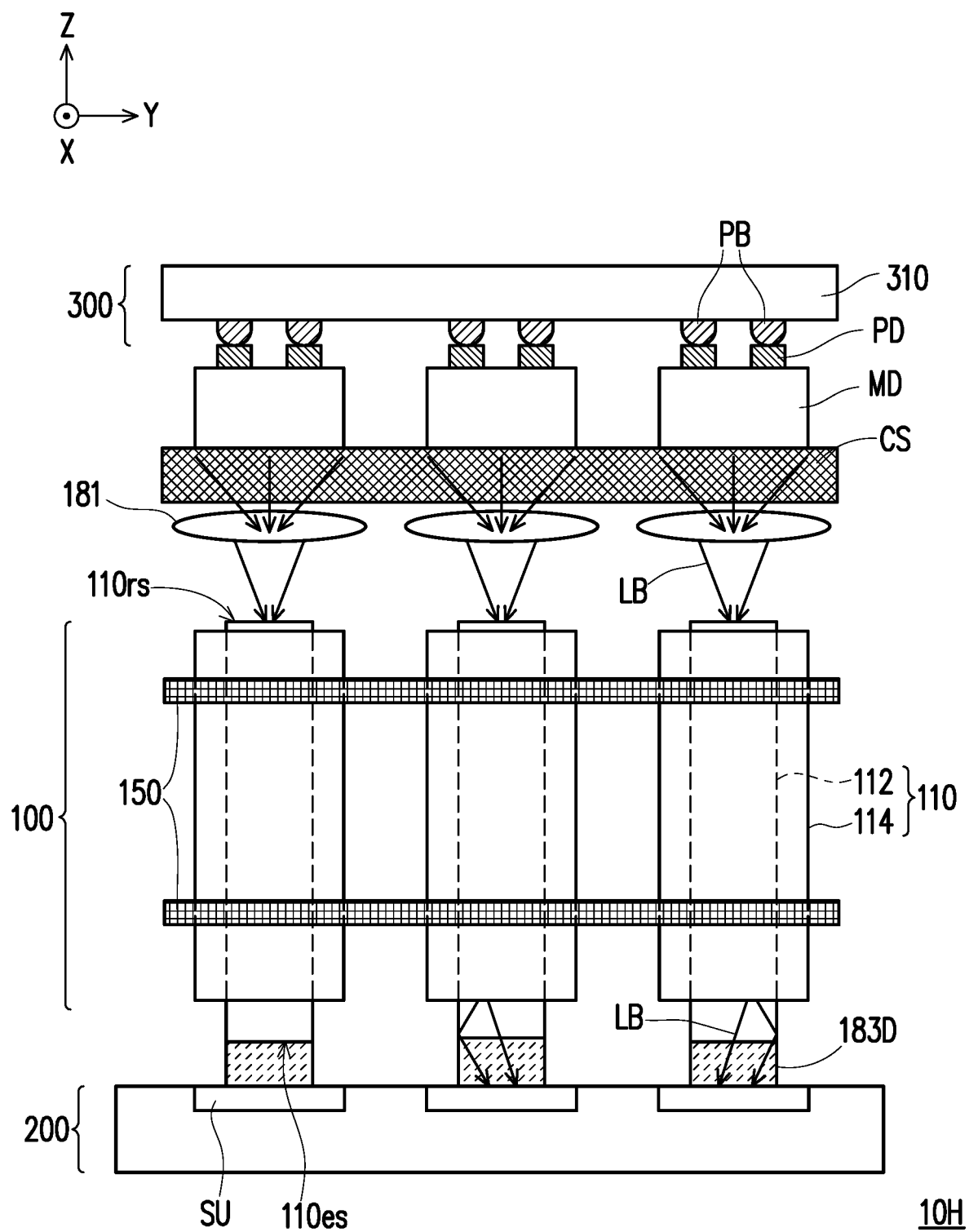
FIG. 8B is a schematic side view of a micro light emitting device inspection apparatus according to a ninth embodiment of the invention.

FIG. 8A is a schematic side view of a micro light emitting device inspection apparatus according to an eighth embodiment of the invention. FIG. 8B is a schematic side view of a micro light emitting device inspection apparatus according to a ninth embodiment of the invention. Referring to FIG. 8A, unlike the light converging device 183 of the micro light emitting device inspection apparatus 10D in FIG. 7A to be an optical lens, a light converging device 183C of a micro light emitting device inspection apparatus 10G in the embodiment is a light guide medium, where the light guide medium may be a fluid having a refractive index close to that of the core layer 112 of the optical fiber 110, such as a refractive index fluid/liquid.

It should be particularly noted that, in the embodiment, the light converging device 183C may be disposed on the detective module 200, and the core layer 112 of the optical fiber 110 is immersed into the light converging device 183C toward an end portion of the detective module 200. Namely, the light emitting surface 110es of the optical fiber 110 is wrapped by the light guide medium serving as the light converging device 183C. Since a refractive index of the light converging device 183C is similar to that of the core layer 112 of the optical fiber 110, a refraction phenomenon of the light beam LB occurred when passing through the light emitting surface 110es may be suppressed, and when the light beam LB is incident on the surface of the sensor, it is less likely to be reflected due to an excessively large difference in the interface refractive index, thereby improving the light collection efficiency of the sensing unit SU and the light energy utilization rate of the micro light emitting device inspection apparatus 10G.

However, the invention is not limited thereto. Referring to FIG. 8B, in another varied embodiment, the light guide medium used as a light converging device 183D of a micro light emitting device inspection apparatus 10H may also be an elastic optical adhesive, and the optical adhesive is connected between the light emitting surface 110es of the optical fiber 110 and the sensor (not shown) of the sensing unit SU. By selecting an optical adhesive with a refractive index similar to that of the core layer 112 of the optical fiber 110, the refraction phenomenon of the light beam LB occurred when passing through the light emitting surface 110es may be effectively suppressed, and when the light beam LB is incident on the surface of the sensor, it is less likely to be reflected due to an excessively large difference in the interface refractive index, thereby improving the light collection efficiency of the sensing unit SU and the light energy utilization rate of the micro light emitting device inspection apparatus 10H.

Figure 9:
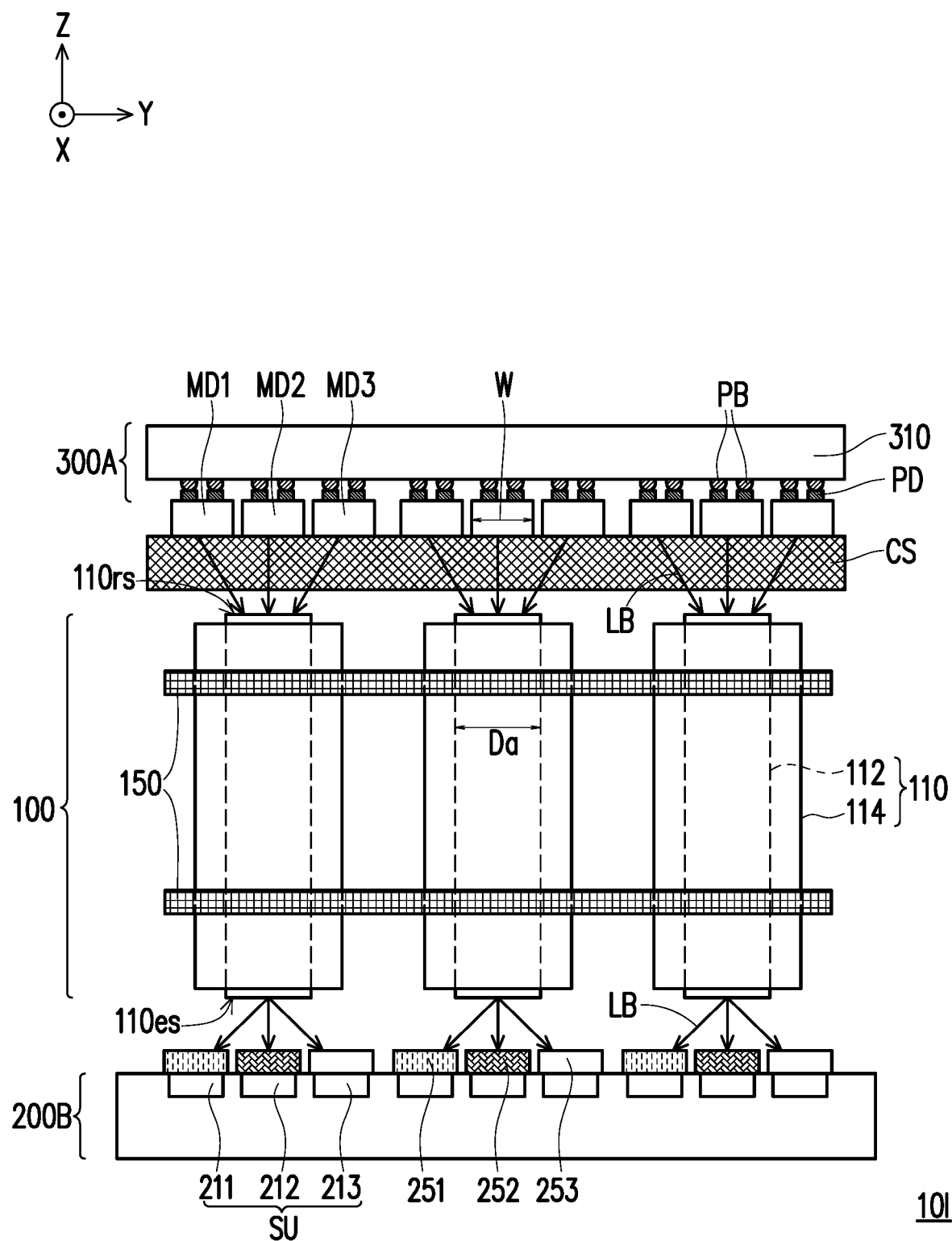
FIG. 9 is a schematic side view of a micro light emitting device inspection apparatus according to a tenth embodiment of the invention.

FIG. 9 is a schematic side view of a micro light emitting device inspection apparatus according to a tenth embodiment of the invention. Referring to FIG. 9, a main difference between a micro light emitting device inspection apparatus 101 of the embodiment and the micro light emitting device inspection apparatus 10 of FIG. 1 is that: the number of the micro light emitting devices corresponding to each optical fiber is different. Specifically, in the embodiment, the number of the micro light emitting devices MD corresponding to the light receiving surface 110rs of each optical fiber 110 is more than two, for example, a first micro light emitting device MD1, a second micro light emitting device MD2, and a third micro light emitting device MD3. Namely, the optical fiber 110 of the embodiment may receive light beams LB emitted from a plurality of micro light emitting devices.

In order to achieve the above configuration relationship, the core layer 112 of each optical fiber 110 has a diameter Da, each micro light emitting device has a width W along a direction parallel to the light receiving surface 110rs, and a ratio of the diameter Da of the core layer 112 of each optical fiber 110 to the width W of each micro light emitting device is greater than or equal to 1 and less than or equal to 4. For example, the diameter Da of the core layer 112 of the optical fiber 110 is 60 μm, and the width W of the micro light emitting device is 15 μm.

In the embodiment, light emitting colors of the first micro light emitting device MD1, the second micro light emitting device MD2 and the third micro light emitting device MD3 may be respectively red, green and blue. A driving module 300A may sequentially drive the micro light emitting devices of different light emitting colors to obtain individual optical properties, or simultaneously drive these micro light emitting devices of different light emitting colors to obtain optical properties after light mixing (such as a brightness of a white frame, color coordinates, etc.). Through a one-to-many relationship between the optical fiber 110 and the micro light emitting devices, the inspection flexibility of the micro light emitting device inspection apparatus 10I may be increased to meet different measurement requirements.

Figure 10A:
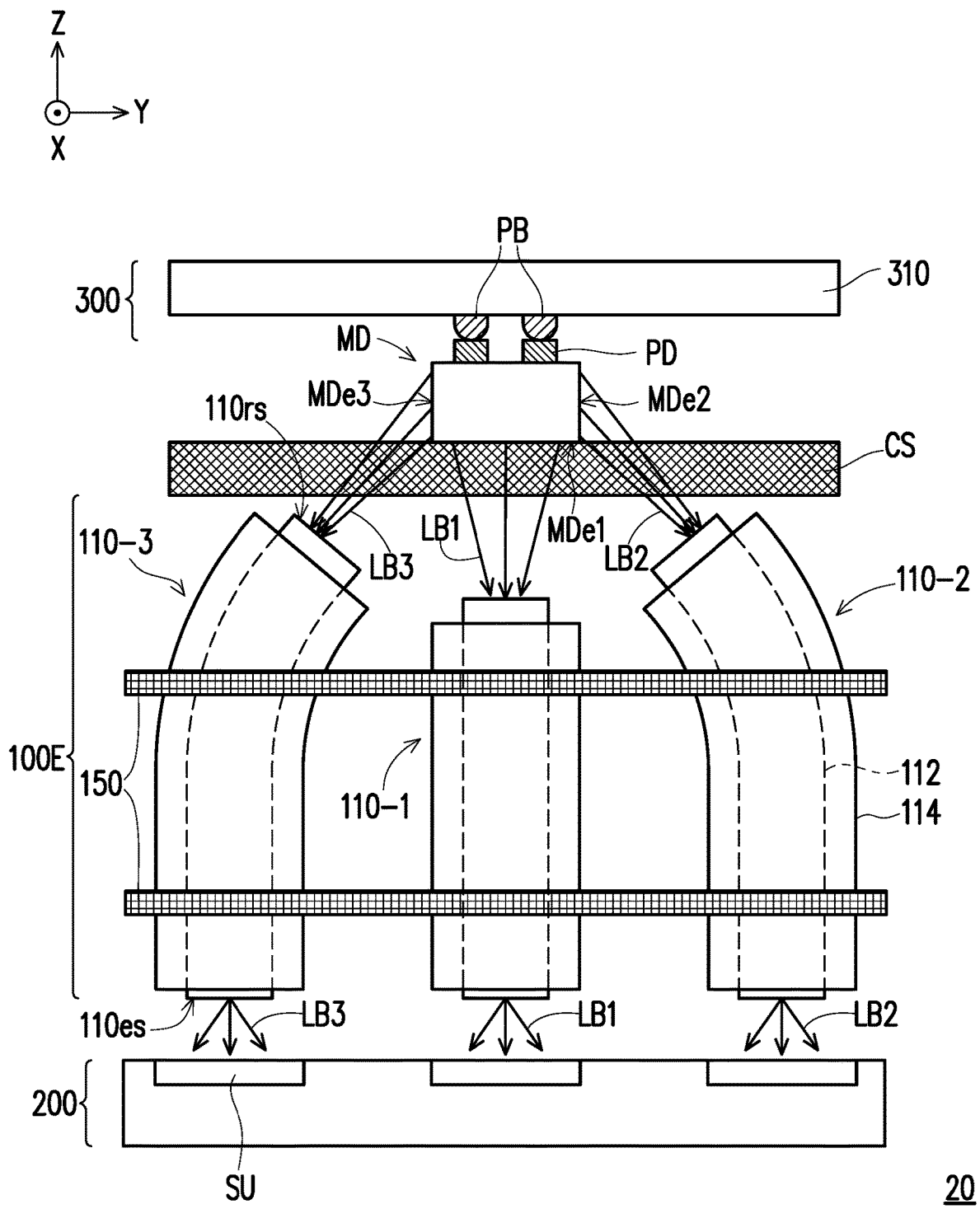
FIG. 10A is a schematic side view of a micro light emitting device inspection apparatus according to an eleventh embodiment of the invention.
Figure 10B:
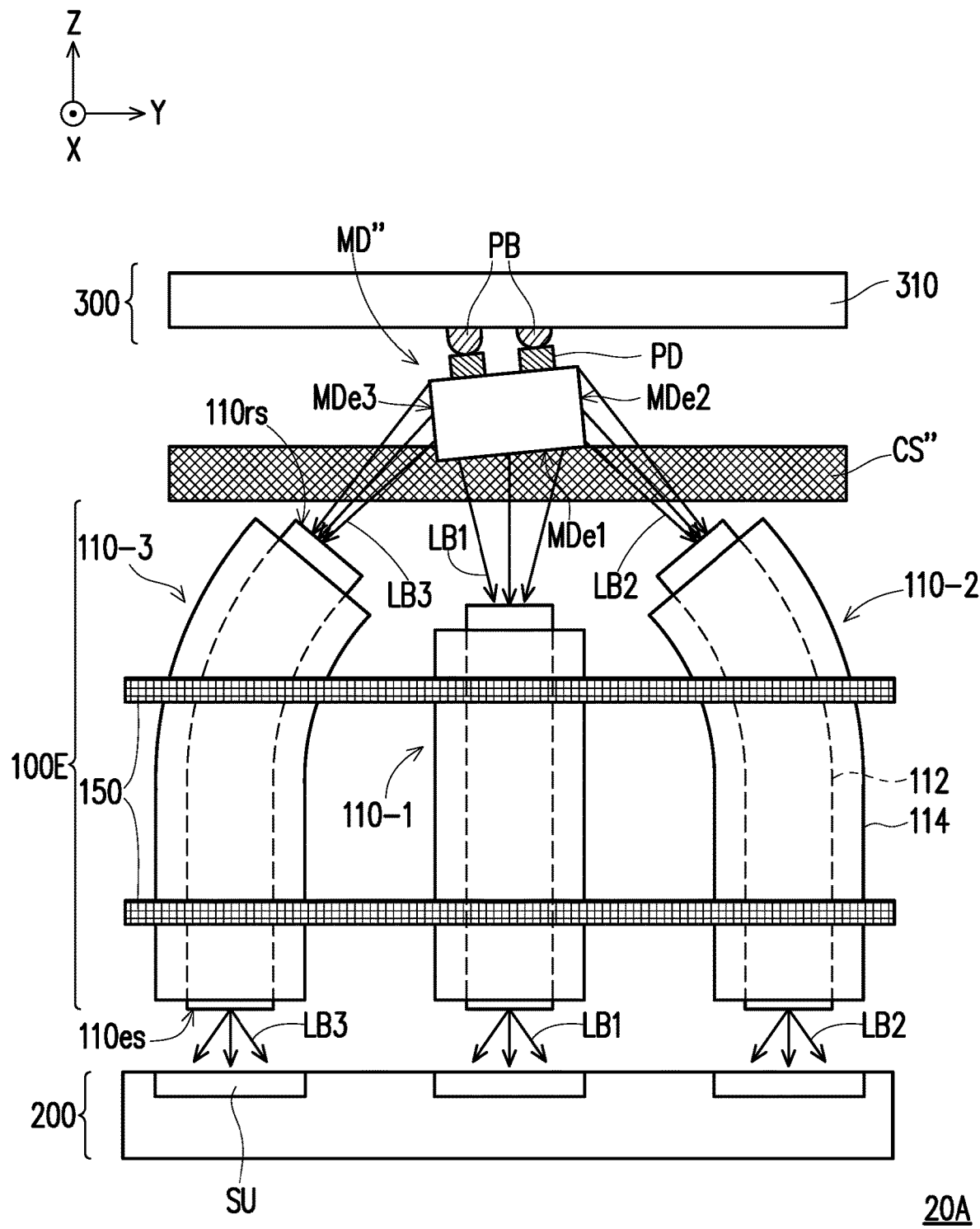
FIG. 10B is a schematic side view of a micro light emitting device inspection apparatus according to a twelfth embodiment of the invention.

FIG. 10A is a schematic side view of a micro light emitting device inspection apparatus according to an eleventh embodiment of the invention. FIG. 10B is a schematic side view of a micro light emitting device inspection apparatus according to a twelfth embodiment of the invention.

Referring to FIG. 10A, a difference between a micro light emitting device inspection apparatus 20 of the embodiment and the micro light emitting device inspection apparatus 10 in FIG. 1 is that the number of optical fibers corresponding to each micro light emitting device is different. Specifically, in a light guide module 100E of the embodiment, the number of optical fibers set corresponding to one micro light emitting device MD is three, which are respectively an optical fiber 110-1, an optical fiber 110-2 and an optical fiber 110-3.

For example, the micro light emitting device MD has a plurality of non-coplanar light emitting surfaces, such as a light emitting surface MDe1, a light emitting surface MDe2, and a light emitting surface MDe3, and the micro light emitting device MD may emit light beams LB1. LB2, and LB3 through these light emitting surfaces. In the embodiment, the light emitting surface MDe1 is, for example, a forward light emitting surface of the micro light emitting device MD, and the light emitting surface MDe2 and the light emitting surface MDe3 are respectively two side wall surfaces connecting the forward light emitting surface.

Particularly, the light receiving surface 110rs of the optical fiber 110-1 of the light guide module 100E is disposed toward the light emitting surface MDe1 of the micro light emitting device MD, and receives the light beam LB1 from the light emitting surface MDe1. The light receiving surface 110rs of the optical fiber 110-2 is disposed toward the light emitting surface MDe2 of the micro light emitting device MD, and receives the light beam LB2 from the light emitting surface MDe2. The light receiving surface 110rs of the optical fiber 110-3 is disposed toward the light emitting surface MDe3 of the micro light emitting device MD, and receives the light beam LB3 from the light emitting surface MDe3. Namely, the light receiving surfaces 110rs of these optical fibers are not parallel to each other, and pointing directions of the end portions of these optical fibers close to the micro light emitting device MD may pass through the micro light emitting device MD, so as to detect light emitting properties (such as light intensity, color coordinates, etc.) of the micro light emitting device MD on different surfaces. For example, it may be used to monitor whether a sidewall light leakage of the micro light emitting device MD has abnormal changes.

However, the invention is not limited thereto. In some cases, such as during a transfer process, a micro light emitting device MD" may be disposed on a carrier stage CS" in a skewed manner, as shown in FIG. 10B. Even so, since the plurality of light receiving surfaces 110rs of the plurality of optical fibers are not coplanar and are respectively set towards the same micro light emitting device MD", the light guide module 100E may still receive the plurality of light beams emitted by the micro light emitting device MD" from different light emitting surfaces. In other words, the optical fiber configuration of the light guide module 110E in FIG. 10A may not only meet the measurement requirements of various optical properties, but also increase the configuration flexibility of the micro light emitting devices on the carrier stage CS".

Figure 11A:
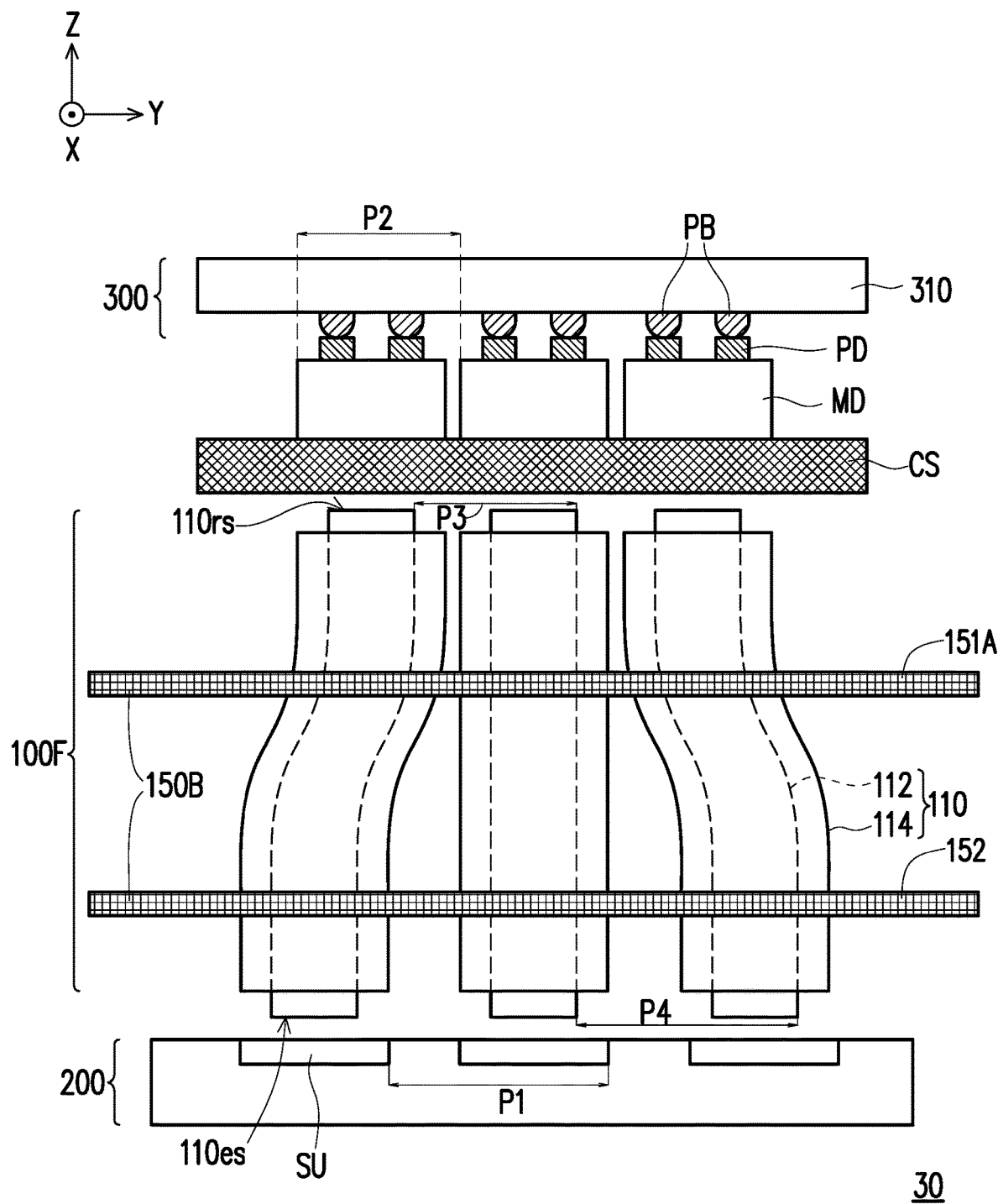
FIG. 11A is a schematic side view of a micro light emitting device inspection apparatus according to a thirteenth embodiment of the invention.
Figure 11B:
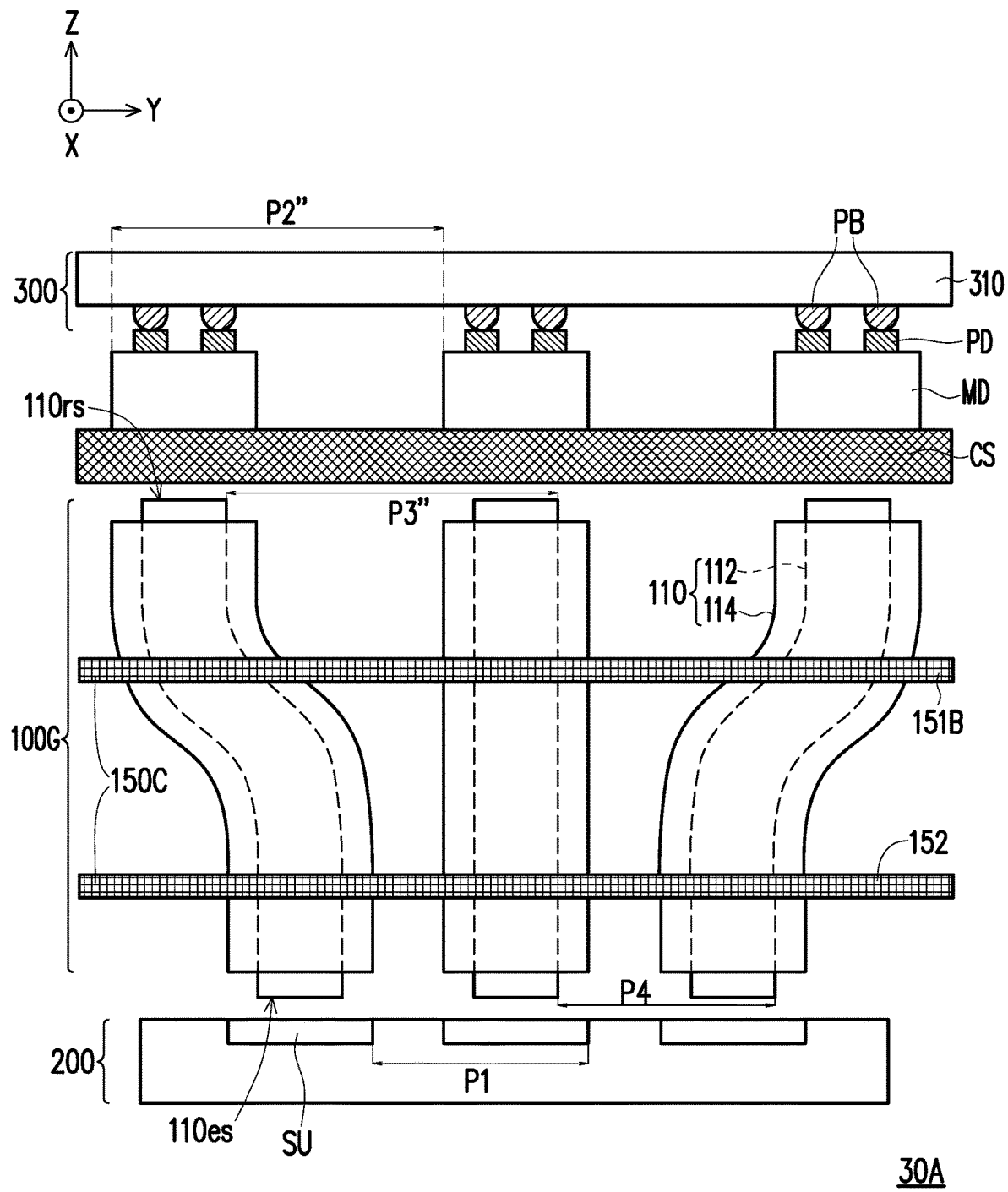
FIG. 11B is a schematic side view of a micro light emitting device inspection apparatus according to a fourteenth embodiment of the invention.

FIG. 11A is a schematic side view of a micro light emitting device inspection apparatus according to a thirteenth embodiment of the invention. FIG. 11B is a schematic side view of a micro light emitting device inspection apparatus according to a fourteenth embodiment of the invention.

Referring to FIG. 11A, in the embodiment, a plurality of sensing units SU of the micro light emitting device inspection apparatus 30 may be arranged along the direction Y according to a pitch P1, and a plurality of micro light emitting devices MD may be arranged along the direction Y according to a pitch P2. Different from the micro light emitting device inspection apparatus 10 of FIG. 1, the arrangement pitch P1 of the plurality of sensing units SU in the embodiment is different from the arrangement pitch P2 of the micro light emitting devices MD. More specifically, a distribution density of the plurality of micro light emitting devices MD on the carrier stage CS is different from a distribution density of the plurality of sensing units SU.

For example, in the embodiment, the distribution density of the plurality of micro light emitting devices MD may be greater than the distribution density of the plurality of sensing units SU. Namely, the distribution of the micro light emitting devices MD is denser than that of the sensing units SU. In order to meet the inspection requirements of densely distributed micro light emitting devices MD, the distribution of the plurality of light receiving surfaces 110rs of the plurality of optical fibers 110 of a light guide module 100F needs to be denser than the distribution of the plurality of light emitting surfaces 110es. For example, a pitch P3 of the plurality of light receiving surfaces 110rs arranged along the direction Y is smaller than a pitch P4 of the plurality of light emitting surfaces 110es arranged along the direction Y.

From another point of view, the distance between the plurality of optical fibers 110 of the light guide module 100F is gradually increased from the light receiving surfaces 110rs to the light emitting surfaces 110es, i.e., the distribution density of the optical fibers 110 is from dense to sparse. Correspondingly, in a fixing structure 150B, a distribution of the holes on the flat plate 151A closer to the light receiving surfaces 110rs of the optical fibers 110 needs to be denser than a distribution of the holes on the other flat plate 152, so as to make the optical fibers 110 passing through the fixing structure 150B to form the above-mentioned arrangement state of from dense to sparse.

However, the invention is not limited thereto. Referring to FIG. 11B, in another varied embodiment of a micro light emitting device inspection apparatus 30A, the distribution of the micro light emitting devices MD on the carrier stage CS may be more dispersed than the distribution of the sensing units SU. For example, a pitch P2" of the micro light emitting devices MD arranged along the direction Y may be greater than the pitch P1 of the sensing units SU arranged along the direction Y. In order to meet the inspection requirements of the dispersed micro light emitting devices MD, the distribution of the plurality of light receiving surfaces 110rs of the plurality of optical fibers 110 of a light guide module 100G needs to be more dispersed than the distribution of the plurality of light emitting surfaces 110es. For example, a pitch P3" of the plurality of light receiving surfaces 110rs arranged along the direction Y is greater than the pitch P4 of the plurality of light emitting surfaces 110es arranged along the direction Y.

From another point of view, the distance between the plurality of optical fibers 110 of the light guide module 100G is gradually decreased from the light receiving surfaces 110rs to the light emitting surfaces 110es, i.e., the distribution density of the optical fibers 110 is from sparse to dense. Correspondingly, in a fixing structure 150C, the distribution of holes on the flat plate 151B closer to the light receiving surfaces 110rs of the optical fibers 110 needs to be more dispersed than the distribution of holes on the other flat plate 152, so as to make the optical fibers 110 passing through the fixing structure 150C to form the above-mentioned arrangement state of from sparse to dense.

In particular, in order to meet the inspection requirements of the micro light emitting devices MD with different distribution densities in FIG. 11A and FIG. 11B, the flat plate 151B (for example, the flat panel 151A of FIG. 11A or the flat panel 151B of FIG. 11B) closer to the micro light emitting devices MD in the fixing structure may be deformed according to a required distribution density of the micro light-emitting elements MD, so as to adjust the arrangement pitch of the holes. For example, the flat plate may be made of a piezoelectric material or materials with temperature-induced deformation properties.

When the micro light emitting device inspection apparatus is to measure a plurality of micro light emitting devices MD as shown in FIG. 11A, the flat plate closer to the micro light emitting devices MD in the fixing structure may be controlled through electronic control or temperature control to shrink a film surface thereof to shorten the distance between the plurality of holes. Conversely, when the micro light emitting device inspection apparatus is to measure the plurality of micro light emitting devices MD as shown in FIG. 11B, the flat plate closer to the micro light emitting devices MD in the fixing structure may be controlled through electronic control or temperature control to stretch the film surface thereof to broaden the distance between the plurality of holes. Accordingly, in addition to meeting the inspection requirements of the micro light emitting devices with different distribution densities, operation convenience of the micro light emitting device inspection apparatus may also be increased.

In summary, in the micro light emitting device inspection apparatus according to an embodiment of the invention, independent arrangement of the plurality of optical fibers ensures that the multiple light beams emitted by the plurality of micro light emitting devices will not interfere with each other during a process of being transmitted to the detective module. Therefore, during the inspection process, these micro light emitting devices may be enabled simultaneously, and the multiple emitted light beams may be simultaneously received and analyzed by the detective module to obtain the respective optical properties of the light beams. In addition to greatly reducing an inspection time, inspection flexibility of the micro light emitting device inspection apparatus is also increased to meet different inspection requirements.

What is claimed is:

1. A micro light emitting device inspection apparatus, adapted to inspect a plurality of micro light emitting devices, and comprising:
    a carrier stage, configured to hold the micro light emitting devices, wherein each of the micro light emitting devices emits a light beam;
    a light guide module, disposed on an optical path of the light beam emitted by each of the micro light emitting devices, and comprising:
    a plurality of optical fibers, each having a light receiving surface and a light emitting surface away from each other, wherein the light receiving surface of each optical fiber is disposed corresponding to at least one micro light emitting device and is configured to receive at least one light beam emitted by the at least one micro light emitting device, and the at least one light beam is transmitted in one of the optical fibers and exits through the light emitting surface; and
    a detective module, disposed on one side of the light emitting surfaces of the optical fibers, and comprises a plurality of sensing units, the light emitting surface of each of the optical fibers corresponds to at least one of the sensing units, and the at least one light beam emitted from the light emitting surface of each of the optical fibers is received by the at least one of the sensing units, wherein each of the sensing units comprises a first sensor, a second sensor, and a third sensor, a plurality of first filter patterns, a plurality of second filter patterns and a plurality of third filter patterns are disposed between the sensing units and the light emitting surfaces of the optical fibers, the first filter patterns are respectively overlapped with the plurality of the first sensors, the second filter patterns are respectively overlapped with the plurality of second sensors, the third filter patterns are respectively overlapped with the plurality of the third sensors, and the detective module is configured to receive and detect the at least one light beam from the light emitting surface of each optical fiber, so as to obtain at least one optical property.

2. The micro light emitting device inspection apparatus as claimed in claim 1, further comprising:
a driving module, having a plurality of probe groups, wherein the probe groups are suitable for being electrically connected to a plurality of pad groups of the micro light emitting devices to drive the micro light emitting devices and obtain at least one electrical property.

3. The micro light emitting device inspection apparatus as claimed in claim 1, wherein the at least one light beam emitted from the light emitting surface of each of the optical fibers is received by at least three of the sensing units.

4. The micro light emitting device inspection apparatus as claimed in claim 1, wherein the sensing units are arranged along a direction according to a first pitch, the micro light emitting devices are arranged along the direction according to a second pitch, and the first pitch is different from the second pitch.

5. The micro light emitting device inspection apparatus as claimed in claim 4, wherein the plurality of light receiving surfaces of the optical fibers are arranged along the direction according to a third pitch, the light emitting surfaces of the optical fibers are arranged along the direction according to a fourth pitch, and the third pitch is different from the fourth pitch.

6. The micro light emitting device inspection apparatus as claimed in claim 1, further comprising:
a plurality of light blocking structures, disposed between adjacent two of the optical fibers, wherein the plurality of light receiving surfaces and the plurality of light emitting surfaces of the optical fibers are blocked by the light blocking structures.

7. The micro light emitting device inspection apparatus as claimed in claim 1, further comprising:
a plurality of light collecting devices, disposed between the micro light emitting devices and the light guide module, and each disposed by overlapping the plurality of light receiving surfaces of the optical fibers, wherein each of the light collecting devices is an optical lens.

8. The micro light emitting device inspection apparatus as claimed in claim 1, further comprising:
a plurality of light converging devices, disposed between the detective module and the light guide module, and each disposed by overlapping the light emitting surfaces of the optical fibers, wherein each of the light converging devices is an optical lens or a light guide medium.

9. The micro light emitting device inspection apparatus as claimed in claim 1, wherein the light receiving surface of each of the optical fibers is disposed corresponding to at least two of the micro light emitting devices.

10. The micro light emitting device inspection apparatus as claimed in claim 1, wherein each of the optical fibers has a diameter, each of the micro light emitting devices has a width along a direction parallel to the light receiving surface, and a ratio of the diameter of each of the optical fibers to the width of each of the micro light emitting devices is less than or equal to 4.

11. The micro light emitting device inspection apparatus as claimed in claim 10, wherein a cross-sectional area of the light beam of each of the micro light emitting devices on the carrier stage is less than an area of the light receiving surface of each of the optical fibers.

12. A micro light emitting device inspection apparatus, adapted to inspect a plurality of micro light emitting devices, and comprising:
a carrier stage, configured to hold the micro light emitting devices, wherein each of the micro light emitting devices emits at least two light beams;
a light guide module, disposed on an optical path of the at least two light beams emitted by each of the micro light emitting devices, and comprises:
a plurality of optical fibers, each having a light receiving surface and a light emitting surface away from each other, wherein each of the micro light emitting devices emits the at least two light beams respectively towards at least two light receiving surfaces of at least two optical fibers, two light receiving surfaces of two of the plurality of optical fibers are not parallel to each other, a normal direction of each of the two light receiving surfaces passes one of the plurality of micro light emitting devices, and the at least two optical fibers receive the at least two light beams and emit the at least two light beams through the at least two light emitting surfaces of the at least two optical fibers; and
a detective module, disposed on one side of the plurality of light emitting surfaces of the optical fibers, wherein the detective module is configured to receive and detect the at least two light beams from the at least two optical fibers, so as to obtain at least one optical property.

13. The micro light emitting device inspection apparatus as claimed in claim 12, wherein each of the micro light emitting devices has at least two non-coplanar light emitting surfaces, and each of the micro light emitting devices emits the at least two light beams respectively through the at least two light emitting surfaces and toward the at least two optical fibers.

* * * * *